United States Patent [19]
Erisman

[11] 3,708,887
[45] Jan. 9, 1973

[54] NOZZLES FOR FLUIDIZED BED VESSEL CONSTRUCTION PLATE

[75] Inventor: Maurice J. Erisman, Oak Park, Ill.

[73] Assignee: FMC Corporation, San Jose, Calif.

[22] Filed: Sept. 8, 1970

[21] Appl. No.: 70,278

[52] U.S. Cl. .............................................. 34/57 A
[51] Int. Cl. ........................... F26b 3/16, F26b 17/00
[58] Field of Search ............... 34/57 A, 57 E, 57, 10; 23/288.3 S, 284; 263/21 A; 210/277; 239/DIG. 1, 267, 271, 552

[56] References Cited

UNITED STATES PATENTS

| | | | |
|---|---|---|---|
| 1,151,348 | 8/1915 | Dunster | 110/175 R |
| 1,713,400 | 5/1929 | Schaperjahn | 110/75 B |
| 1,873,594 | 8/1932 | Johnson | 210/277 |
| 2,378,157 | 6/1945 | Ramseyer et al. | 34/57 A |
| 2,389,133 | 11/1945 | Brassert et al. | 34/57 A X |
| 3,040,439 | 6/1962 | Frost | 34/57 A |
| 3,197,286 | 7/1965 | Farkas et al. | 23/288.3 S X |
| 3,298,793 | 1/1967 | Mallison et al. | 34/57 A UX |
| 3,494,046 | 2/1970 | Harkreader | 34/57 A X |

FOREIGN PATENTS OR APPLICATIONS 377,433   7/1932   Great Britain ............... 110/75 B Primary Examiner—William F. O'Dea
Assistant Examiner—W. C. Anderson
Attorney—F. W. Anderson and C. E. Tripp

[57] ABSTRACT

An improved nozzle is provided for the constriction plate in a fluidized bed type of heat transfer apparatus.

3 Claims, 10 Drawing Figures

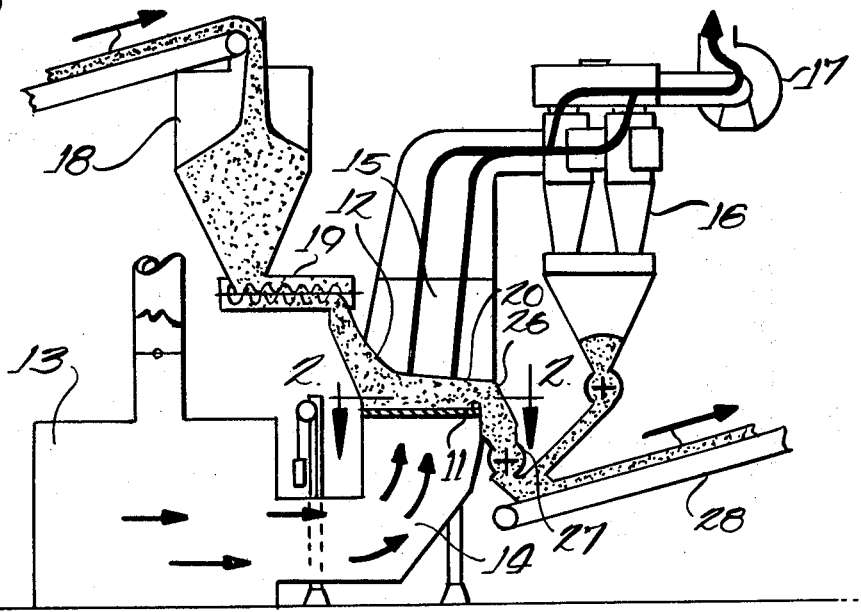

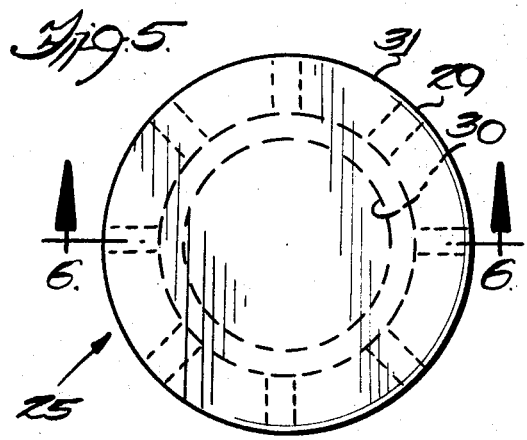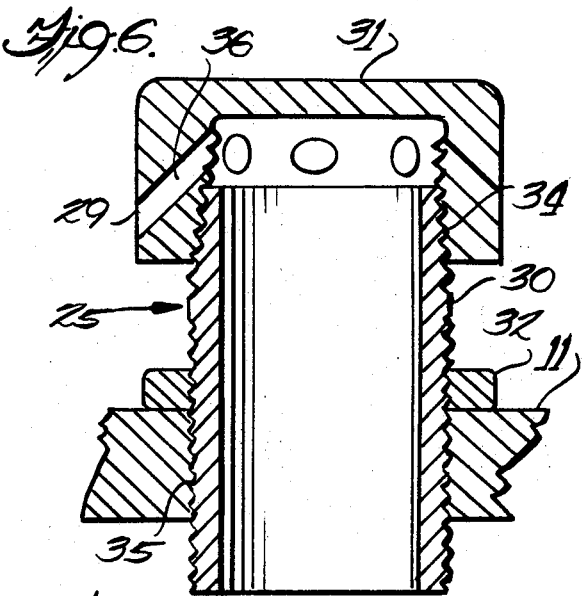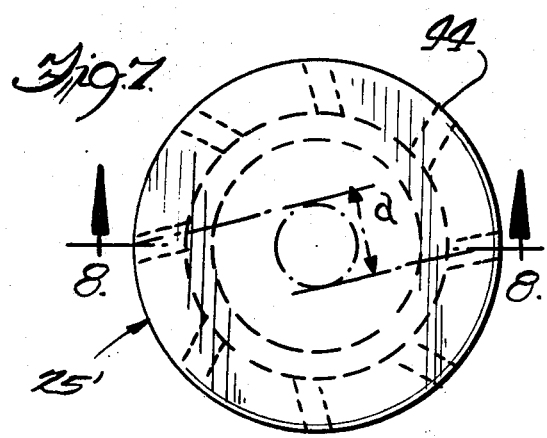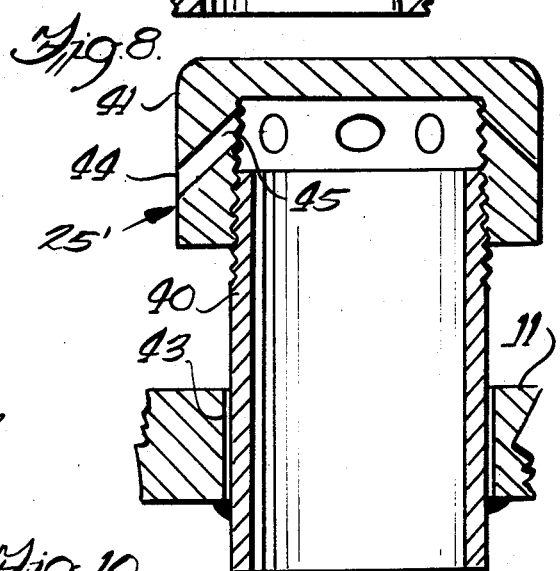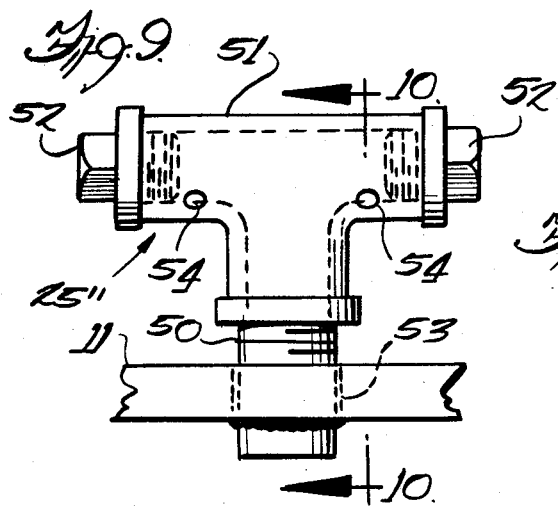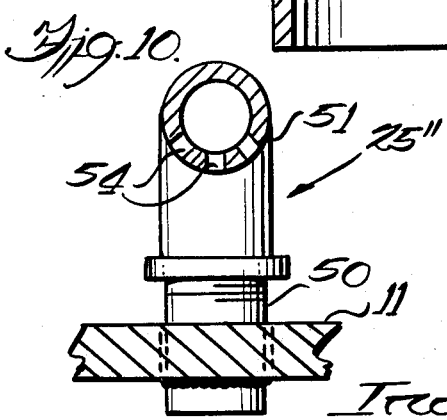

NOZZLES FOR FLUIDIZED BED VESSEL CONSTRUCTION PLATE

BACKGROUND OF THE INVENTION

1. Field of the Invention

This invention relates generally to heat transfer vessels of the fluidized bed type and more particularly to new and improved nozzles located in the horizontally positioned construction plate for feeding gases into a bed of particulate bulk material on the construction plate for fluidizing such material. The nozzles are adjustable, have inclined orifices which prevent the entrance of material and the resulting direction of the gases tends to prevent build up of the material adjacent to the nozzle which might otherwise become overheated and ignite if combustible.

2. Description of the Prior Art

A nozzle for a construction plate in a fluidized bed apparatus is disclosed in the U.S. Pat. No. 2,841,476 issued to B. S. Dalton on July 1, 1958. This vertical nozzle has horizontally elongated passageways for the fluidizing gases which are of a length greater than the distance to which the solids would reach in the passageway under the normal angle of repose of the defluidized solids so that sifting of these solids into the main body of the nozzle is prevented.

Another nozzle for a gas diffusing plate in a solids fluidizing vessel is disclosed in U.S. Pat. No. 3,040,439 issued to W. G. Frost on June 26, 1962. This vertical nozzle includes a conical head with its perimeter overhanging the shank portion to prevent the solids from falling into the windbox. This nozzle also has an annular array of radial holes through the shank of the nozzle and under the conical head, whose axes are downwardly inclined.

In U.S. Pat. No. 3,370,938, issued to Newman et al. on Feb. 27, 1968, tuyeres for a fluidizing vessel are disclosed that use a tubular member closed at the top and that have gas distributing nozzles which are inclined downwardly. Overcaps are also provided on the bottom of the tubular member, which have orifices for controlling the flow of fluidizing gas.

A further type of nozzle for a fluid bed processor is disclosed in U.S. Pat. No. 3,495,336, issued to Gecewich et al. on Feb. 17, 1970. This unit comprises a round headed pin having a large diameter washer under the head. This assembly is mounted in an aperture in the construction plate, the diameter of the aperture being approximately twice the diameter of the pin. The assembly is constrained from lifting completely out of the aperture under the flow of gas by a horizontally mounted pin through the lower end of the body of the round headed pin under the construction plate. The pin and washer assembly rises above the level of the construction plate under the pressure of the flowing gas and the washer diameter is sufficiently large that due to the normal angle of repose of the solids around the periphery of the washer, the solids do not reach the aperture and are thus prevented from falling into the plenum chamber. When the gas flow is stopped, the pin-washer assembly drops back onto the construction plate to close the aperture in the plate and thus seal this opening from the solids.

SUMMARY OF THE INVENTION

In a heat transfer vessel of the fluidized bed type a horizontal construction plate or grate is generally provided on which the bed of bulk material rests. The construction plate provides a controlled pressure drop of gases flowing from below the construction plate through the bed of material. This flowing gas has to be distributed and diffused uniformly throughout the bed to properly fluidize the material so that the particles of material are completely surrounded by the gas. Material characteristics, such as grain size, amount of moisture, and particle size distribution, all affect the velocity of the gas required to obtain the proper turbulence to separate and suspend the particles so that efficient heat transfer can take place. When fluidized, the material above the construction plate acts like a fluid and flows in a generally horizontal path directly above the plate. The bed depth is controlled by a discharge weir and the amount of fluidization. When the material flows over the weir, it is collected in a chute and passes through an air-lock gate to a conveyor or other means of discharge. The gases above the bed pass through a dust collector, where the fines are separated to a fan and are then generally discharged into the atmosphere.

This invention relates particularly to the type of nozzles used in the construction plate. The nozzle itself comprises a vertical tubular member mounted in the construction plate and a compact cap member so that nozzles may be placed relatively close together without interference. The cap member contains a series of orifices around its periphery, each orifice having a downwardly inclined axis and communicating with the central internal passage of the vertical tubular member. The inclined orifices direct the flowing gas around the base of the tubular member to fluidize the material in this area, as well as above, so that buildup of material at the tube base is prevented. In the case of a combustible material, such as fine soft coal, this gas movement at the base of the nozzle will further prevent the otherwise stationary material from overheating and burning. The cap member is further easily removed, for cleaning or changing to obtain orifices of a different quantity or inclination of their axes, without disturbing the vertical tubular member or permitting material to fall into the apertures in the construction plate. The tubular member, in the preferred embodiment, is further constructed so that the height of the orifices above the construction plate is adjustable and can be easily varied to obtain the maximum cleaning effect around its base and to obtain maximum efficiency of fluidization.

Accordingly, it is an important object of the present invention to provide an improved nozzle for a fluid-bed heat transfer vessel.

Another object of the invention is to provide a nozzle that is relatively compact in size so that multiple nozzles may be placed close together without interference.

Another object of the invention is to provide a nozzle in which the orifices are located in an easily removable member for quick substitution of other units having different sizes of apertures, angles of inclination of the orifices, or quantity of orifices without disturbing the member in the construction plate.

A further object of the invention is to provide a nozzle in which the vertical member in the construction plate is adjustable so that the height of the orifices may

BRIEF DESCRIPTION OF THE DRAWINGS

FIG. 1 is a diagramatic and schematic illustration, with certain portions in section, of a heat transfer apparatus of the fluidized bed type that is particularly useful for drying the bulk material being processed.

FIG. 2 is a plan view of the constriction plate taken along line 2—2 in FIG. 1.

FIG. 3 is a fragmentary elevational view of the constriction plate of FIG. 2 showing one nozzle in position.

FIG. 4 is an enlarged elevational view of one nozzle in the constriction plate surrounded by the bed of material, with flow lines indicating the flow of gas.

FIG. 5 is a plan view of one embodiment of a nozzle of the invention.

FIG. 6 is a cross-sectional view of the nozzle taken along line 6—6 in FIG. 5.

FIG. 7 is a plan view of a second embodiment of a nozzle of the invention.

FIG. 8 is a cross-sectional view of the nozzle taken along line 7—7 of FIG. 7.

FIG. 9 is a side elevational view of a third embodiment of a nozzle of the invention.

FIG. 10 is a cross-sectional view of the nozzle taken along line 9—9 of FIG. 9.

DESCRIPTION OF THE PREFERRED EMBODIMENTS

In FIG. 1 there is shown a heat transfer apparatus of the type in which the apparatus of the present invention is used. In particular there is illustrated a dryer of the fluidized bed type in which a constriction plate 11 is used to diffuse and control hot air being fed into the bed of particulate material 12. An air heater 13 provides hot air, which passes through a plenum chamber 14 and is forced through the constriction plate and the bed of material in a drying chamber 15. The hot gases, dust, and fines are pulled through a dust collector 16 by a fan 17 and are then exhausted to the atmosphere. The bulk material to be dried is stored in a hopper 18 and is fed by a screw feeder 19 onto the constriction plate 11, which has a weir 20 to control the depth of the bed. The constriction plate contains a series of nozzles 25 of the present invention, to be described later, and the hot gas flowing through the nozzles fluidizes the bed of material so that the solid particles are separated and suspended. In this state, the fluidized material behaves like a liquid and flows in a generally horizontal path directly above the constriction plate 11 and over the weir 20 into a discharge chute 26. The discharge chute has a rotary valve or air-lock 27 to control the material flow onto a discharge conveyor 28.

While the illustrative example shows a single constriction plate construction for drying, it is to be understood that the present invention can be equally well used as a cooler or in a combination dryer-cooler in which dual constriction plates are used. In the latter, cool air is fed through the lower plate; while hot air is fed into the chamber between the two plates and through the upper plate. The material is first dried on the upper plate and is then fed onto the lower plate for cooling before discharge.

FIGS. 2 and 3 illustrate the constriction plate 11, which has a series of closely spaced staggered holes in which nozzles 25 are mounted. Nozzles 25, as shown in FIG. 4, project upward into the bed of material 12 and have orifices 29 which direct the flow of gas downwardly onto the constriction plate 11, the gas then flowing upwardly through the bed of material 12. The quantity and spacing of the nozzles will be dependent upon the area of the constriction plate and the type and condition of the material being processed so as to obtain the desired even distribution of gas to properly fluidize the material.

The preferred embodiment of nozzle 25, as shown in FIGS. 5 and 6, comprises a tubular member 30, a cap member 31, and an adjusting nut 32. As shown, the tubular member 30 is externally threaded with a straight screw thread 33 for most of its length but has a tapered pipe thread 34 at its top end. The holes 35 in the constriction plate 11 contain matching straight threads for securing the lower end of the tubular member therein. The nut 32 locks the tubular member 30 at a predetermined height or degree of rotation. It is, of course, also possible to eliminate the threads in plate 11 and lock the tubular member 30 in the constriction plate by using two nuts 32, one being on top of plate 11 as shown and a second nut being under plate 11. The cap member 31 is a short tubular piece closed at its top and having an internal tapered pipe thread for securing the cap to the upper end of the tubular member 30 in an overlapping relationship. A series of orifices 29 are drilled through the tubular section of the cap in a radial direction and having a downwardly inclined axis. The inner upper end 36 of the orifices is open to the interior of the cap so that a passageway is provided for the gas to flow from below the constriction plate, up the inside of tubular member 30 into the interior of cap 31 and then out through orifices 29 above the constriction plate. The number and size of the orifices is selected to obtain the desired volume of gas flow and the velocity of its stream to best suit the type of material being fluidized. The axis of inclination of the orifices may vary, but an angle in the range of 30° to 45° to the horizontal might be considered average.

It is to be noted that the cap 31 is easily removed and a cap with different orifice construction may be used to replace the original cap to change or improve the performance of the individual nozzle. The vertical projection of the nozzle above the constriction plate 11 may be easily adjusted up or down by means of the threaded tubular member 30 and nut 32 so as to obtain the desired movement of the particles around the base of the nozzle and so that no dead areas exist where material can build up and become overheated.

A second embodiment of the nozzle is shown in FIGS. 7 and 8. Nozzle 25' comprises a tubular member 40 and a cap member 41. Tubular member 40 has an external tapered pipe thread 42 on its upper end. Cylindrical holes 43, only slightly larger in diameter than the outside diameter of tubular member 40, are punched or drilled in constriction plate 11. The tubular member is inserted in the hole so that its upper end is at the desired height above the plate and is welded thereto. It is understood that the adjustable threaded means shown in FIG. 6 may also be used in securing the tubular member 40 to the constriction plate in this embodiment. Cap member 41 is similar to cap member 31 but in this case the orifices 44 are not radial. As shown in FIG. 7, the axes of these orifices are tangent to a small central circle of diameter "d" as well as being downwardly inclined, as shown in FIG. 8. The inner upper end 45 of the orifices is open to the interior of cap 41 so that a passageway is provided for the gas to flow from below the constriction plate 11 up the inside of tubular member 40 into the interior of cap 41 and then out through orifices 44 above the constriction plate in a swirling manner so that thorough distribution of the gas results.

As in the first embodiment, the number and size of orifices 44 in nozzle 25' is selected to obtain the desired volume of gas flow and the velocity of its stream to best suit the type of material being fluidized. Cap 41 is easily removed and a cap with different orifice construction may be used to replace the original cap to change or improve the performance of the individual nozzle.

Another embodiment of the nozzle of this invention is shown in FIGS. 9 and 10. Nozzle 25" comprises a short tubular member 50, a T-shaped fitting 51 and two plugs 52. Tubular member 50 may be a short pipe nipple threaded on one end. Cylindrical holes 53, only slightly larger in diameter than the outside diameter of the tubular member 50, are punched or drilled in constriction plate 11. The tubular member is inserted in a hole 53 so that its upper end is at the desired height above the plate and is welded thereto. It is understood that the adjustable threaded means shown in FIG. 6 may also be used for securing the tubular member 50 to the constriction plate in this embodiment. A threaded T-shaped fitting 51, such as a pipe tee, is mounted on the upper end of member 50. The two horizontal openings of fitting 51 are provided with screwed plugs 52 to seal these openings. Radial orifices 54 are provided in the lower portions of each of the horizontal extensions of T-shaped fitting 51. As shown in FIG. 10, three such orifices are indicated, one vertically from the bottom on the centerline and two at approximately 45° on each side of the vertical centerline. The inner ends of orifices 54 are open to the interior of T-shaped fitting 51 so that passageways for the gas from below the constriction plate are provided. As in the other embodiments, the number and size of orifices 54 are selected to obtain the desired gas flow and the velocity of its stream to best suit the type of material being fluidized but the orifices should be kept below the horizontal centerline of the T-shaped fitting to prevent entrance of the fine particles in the bed of material into the orifices during a shutdown.

Although the best mode contemplated for carrying out the present invention has been shown and described herein, it will be apparent that modifications and variations may be made without departing from what is regarded the subject matter of the invention.

What I claim is:

1. A nozzle for a fluidized-bed heat transfer apparatus of the type having a constriction plate with a plurality of spaced holes in which the nozzles are installed, a plenum chamber for the fluidizing gas under the constriction plate, and a heat transfer chamber above the constriction plate in which a bed of particulate material is formed, the combination which comprises:

a. a vertical tubular member mounted in one of the holes of the constriction plate, said tubular member being adjustable vertically and projecting above the constriction plate into the bed of material; and b. a cap member removably attached to the upper end of said tubular member, said cap member having a closed top portion and a vertical skirt portion depending from said top portion, said skirt being provided with a plurality of orifices controlling the flow of gas, said skirt having a vertical wall of sufficient thickness for each of said orifices to form a downwardly inclined passageway connecting the interior of said cap member above the top of said tubular member to a discharge point on the outer surface of said skirt portion, whereby the fluidizing gas can flow under pressure from below the constriction plate relatively unrestrictedly through the bore of said vertical tubular member into the interior of said cap member and then flow controllably downwardly and outwardly through said plurality of orifices in said cap member to uniformly distribute the gas into the bed of particulate material surrounding the base of said tubular member to thereby fluidize the bed of particulate material and to prevent buildup of material around the base of said tubular member.

2. A nozzle for a fluidized bed heat transfer apparatus of the type having a constriction plate with a plurality of spaced holes in which the nozzles are installed, a plenum chamber under the constriction plate with a source of fluidizing gas under pressure, and a heat transfer chamber above the constriction plate in which a bed of particulate material is formed, the combination which comprises:

a. a vertical tubular member removably and adjustably mounted in one of the holes of said constriction plate and projecting above the constriction plate into the bed of material, said tubular member having a relatively unrestricted internal passageway therethrough communicating with the plenum chamber; and b. a cap member removably attached to the upper end of said tubular member, said cap member having a short annular body portion, a closed top portion, and pressure tight fastening means for attaching said cap member to said tubular member, said cap member having a plurality of orifices in the periphery of said body portion, said orifices controlling the flow of fluidizing gas to the bed of particulate material, said annular body portion having a vertical wall of sufficient thickness for each of said orifices to form a downwardly inclined passageway connecting the interior of said annular body portion above the top of said tubular member to a discharge point on the periphery of said body portion, whereby the fluidizing gas can flow unrestrictedly from the plenum chamber through the tubular member into the annular body portion of the cap member and then be uniformly distributed through the plurality of inclined orifice passageways in said cap member into the bed of particulate material around the base of the tubular member to thereby fluidize this material and upon stopping the flow of pressurized fluidizing gas, the inclined passageways prevent the inward flow of material into the nozzle which might thereby plug the nozzle.

3. In a nozzle for a fluidized bed heat transfer apparatus of the type having a constriction plate in which a plurality of the nozzles are mounted, a plenum chamber under the constriction plate with a source of fluidizing gas under pressure, and a heat transfer chamber above the constriction plate in which a bed of particulate material is formed, the improvement which comprises:

a. a vertical hollow member removably mounted in the constriction plate, the hollow portion of said member providing a relatively unrestricted communicating passage between the plenum chamber and the top of said hollow member, said hollow member being adjustably mounted in the constriction plate to vary the projection of the nozzle into the bed of material above the constriction plate; and b. a cap member detachably secured to the upper end of said hollow member, said cap member having an annular body portion, a closed top portion and pressure tight fastening means for securing said cap member to said hollow member, said body portion having a plurality of orifices providing a series of passageways from the interior of said body portion above the top of said hollow member to the outer periphery of said body portion, said passageways being inclined downwardly and being oriented radially from the center of said cap member, said annular body portion having a sidewall thickness such that the interrelationship between the vertical height of the orifice, the angle of inclination of the orifice passageway and the angle of repose of the particulate material will not permit the particulate material to flow upwardly through the inclined passageway and into the interior of the cap member when the flow of pressurized fluidizing gas is stopped, said orifices further providing for controlled flow of the fluidizing gas from the interior of said cap member to uniformly distribute the gas into the particulate material to thereby fluidize the bed of material and to prevent buildup of the material around the base of said hollow member.

* * * * *